G. KAMPS.
Making Vinegar.
No. 63,256. Patented March 26, 1867.
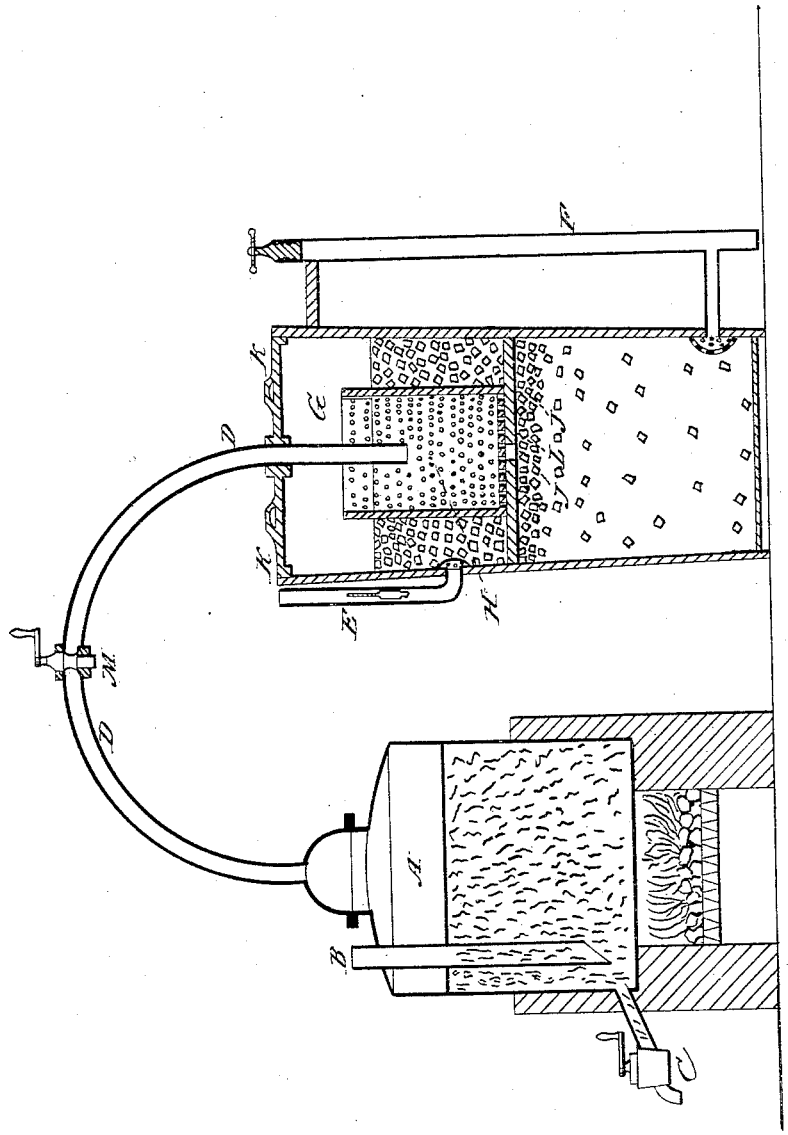
Witnesses:
William Gerhardt
Firmus L Clark
Inventor:
Gerhard Kamps

United States Patent Office.

GERHARD KAMPS, OF PITTSBURG, PENNSYLVANIA.

Letters Patent No. 63,256, dated March 26, 1867.

---

IMPROVEMENT IN THE MANUFACTURE OF VINEGAR.

---

*The Schedule referred to in these Letters Patent and making part of the same.*

---

TO ALL WHOM IT MAY CONCERN:

Be it known that I, GERHARD KAMPS, of the city of Pittsburg, in the county of Allegheny, and State of Pennsylvania, have invented a new Process for Manufacturing Vinegar without the use of alcohol or other distilled liquor; and I do hereby declare that the following is a full and exact description thereof, reference being had to the accompanying drawing, and to the letters of reference marked thereon.

The nature of my invention consists in manufacturing vinegar from any vegetable substance containing saccharine or farinaceous qualities. To accomplish this purpose I make use of the chemical apparatus and process hereinafter described and illustrated by the accompanying drawing, which is a sectional view of my apparatus.

To enable others skilled in the art to make and use my process, I will proceed to explain the apparatus and process.

A is the boiler, with a feed pipe, B, through which the vegetable substance is introduced into the boiler. C is a waste pipe through which the residuum is withdrawn at the completion of the operation. D is a pipe through which the vapor from the boiler is conveyed into the tank G. H is a perforated wooden tub supported by the cross-bars J J. The tank is provided with movable covers K K, and the tube E containing the hydrometer. F is a tube, connected with the bottom of the tank, through which the vinegar is drawn at the completion of the process. L L are blocks of acidulated wood. These blocks are of red beech wood boiled until freed from sap, dried, and steeped in strong vinegar.

Process.

Water is poured into the tank G until the end of the steam pipe D is immersed sufficiently, the acidulated blocks are then placed in the tank, giving a slight acidity to the water; the perforated tub H prevents these blocks from obstructing the steam pipe or interfering with the operation. The vegetable matter, which may be potatoes, beets, corn, rye, or any other vegetable substance containing saccharine or farinaceous matter, as above stated, is prepared by being bruised or ground, mixed with water, and fermented by a chemical process. When the fermentation has ceased it is introduced into the boiler A through the tube B. Heat is then applied to the boiler, and the alcoholic vapor from A passes off through the pipe D and is condensed in the tank G, the hydrometer designating when the requisite specific gravity is obtained. The steam is then shut off by the stop-cock M, and the acetic ether thus obtained is pumped out through the pipe F into a reservoir, (not shown,) where it is finished. A fresh supply of water is let into the tank G and the process repeated until the flavoring qualities of the vegetable matter are exhausted.

Claim.

What I claim as my invention, and desire to secure by Letters Patent of the United States, is—

The mode of manufacturing vinegar from any vegetable substance containing saccharine or farinaceous qualities.

GERHARD KAMPS. [SEAL.]

Witnesses:
    J. DONALDSON,
    FRANCIS L. CLARK.